US008702314B2

(12) United States Patent
Takimoto

(10) Patent No.: US 8,702,314 B2

(45) Date of Patent: Apr. 22, 2014

(54) ROLLING BEARING UNIT

(71) Applicant: JTEKT Corporation, Osaka (JP)

(72) Inventor: Masao Takimoto, Kashiwara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/791,120

(22) Filed: Mar. 8, 2013

(65) Prior Publication Data

US 2013/0243360 A1 Sep. 19, 2013

(30) Foreign Application Priority Data

Mar. 15, 2012 (JP) ................................ 2012-058316

(51) Int. Cl.
*F16C 33/78* (2006.01)

(52) U.S. Cl.
USPC ............................ 384/486; 384/548; 277/353

(58) Field of Classification Search
USPC ......... 384/477, 480, 484–486, 488, 544, 548; 277/345, 353, 361, 549, 349
See application file for complete search history.

(56) References Cited

U.S. PATENT DOCUMENTS 3,519,316 A * 7/1970 Gothberg ...................... 384/486
3,936,105 A * 2/1976 Asberg ....................... 384/482
4,040,683 A * 8/1977 Korenhof ..................... 384/482
4,118,080 A * 10/1978 Kregler et al. ................ 384/482
4,372,628 A * 2/1983 Kiener et al. ................ 384/476
5,454,647 A * 10/1995 Otto ............................ 384/486
5,711,616 A * 1/1998 Gassmann et al. ............ 384/482
6,050,571 A * 4/2000 Rieder et al. .................. 277/353
6,485,188 B1 * 11/2002 Dougherty .................... 384/589
7,258,490 B2 * 8/2007 Peschke et al. ............... 384/485
7,674,044 B2 * 3/2010 Matsui .......................... 384/486
8,047,721 B2 * 11/2011 Aritake et al. ................ 384/544
2007/0076994 A1 * 4/2007 Norimatsu et al. ........... 384/486
2007/0147718 A1 6/2007 Takimoto
2007/0172163 A1 * 7/2007 Yamamoto .................... 384/448
2007/0278748 A1 * 12/2007 Matsui et al. ................ 277/549
2010/0247014 A1 * 9/2010 Ohmori et al. ................ 384/486

FOREIGN PATENT DOCUMENTS

GB 2123096 A * 1/1984 .............. F16C 33/72
JP A-2007-177814 7/2007
JP 2008223884 A * 9/2008 .............. F16C 33/78
JP 2010060126 A * 3/2010 .............. F16C 33/80
JP 2012241827 A * 12/2012 .............. F16C 33/78

* cited by examiner

*Primary Examiner* — Marcus Charles
(74) *Attorney, Agent, or Firm* — Oliff PLC

(57) ABSTRACT

An inner diameter of a cylindrical portion of a metal core is set to such a value that the cylindrical portion is fitted to an outer ring by interference fit. An inner periphery of an end portion of the cylindrical portion of the metal core is larger in diameter than an inner periphery of a portion of the cylindrical portion, which is fitted to the outer ring. An elastic seal has a cylindrical portion that is in close contact with an outer periphery of the cylindrical portion of the metal core, and a folded-back portion that extends from the cylindrical portion. The folded-back portion is compressively deformed by being sandwiched between the inner periphery of the end portion of the cylindrical portion of the metal core and the outer periphery of an outer ring.

3 Claims, 3 Drawing Sheets

8 7 2 9 5 1 6 3a 3b 4 4 5 3

36 8 31 22a 22 35 12 11 21 32 7 21a 32a 2 37 2a 38 10 22b 22c 33 34 3

ROLLING BEARING UNIT

INCORPORATION BY REFERENCE

The disclosure of Japanese Patent Application No. 2012-058316 filed on Mar. 15, 2012 including the specification, drawings and abstract is incorporated herein by reference in its entirety.

BACKGROUND OF THE INVENTION

1. Field of the Invention

The invention relates generally to a rolling bearing unit, and more specifically to a rolling bearing unit that includes a sealing device.

2. Description of Related Art

A rolling bearing unit that includes a sealing device is used as a bearing unit that is used in an environment in which water is likely to enter the bearing unit from the outside, such as a bearing unit for a wheel of a vehicle. As such a rolling bearing unit that includes a sealing device, Japanese Patent Application Publication No. 2007-177814 (JP 2007-177814 A) describes a rolling bearing unit that includes an outer ring, an inner ring, a plurality of rolling elements, and a sealing device that is disposed at at least one of a position between one end portion of the outer ring and one end portion of the inner ring, and a position between the other end portion of the outer ring and the other end portion of the inner ring. The sealing device described in JP 2007-177814 A includes a metal core and an elastic seal. The metal core has a cylindrical portion that is fitted to an outer periphery of the outer ring. The elastic seal is fitted to the metal core.

In the rolling bearing unit described in JP 2007-177814 A, the cylindrical portion of the metal core is fitted to the outer ring by interference fit to prevent entry of water into the rolling bearing unit through a joint between the cylindrical portion and the metal core. However, the metal core is formed by press working, and therefore the accuracy of the metal core is not sufficiently high. Therefore, when the cylindrical portion is fitted to the outer ring, the cylindrical portion may flare out at its end portion and the end portion may be apart from the metal core. In this case, the waterproof property at the joint is reduced.

SUMMARY OF THE INVENTION

It is an object of the invention to provide a rolling bearing unit in which the waterproof property at a joint between a metal core of a sealing device and an outer ring is improved.

An aspect of the invention relates to a rolling bearing unit, including: an outer ring; an inner ring; a plurality of rolling elements; and a sealing device that is disposed at at least one of a position between one end portion of the outer ring and one end portion of the inner ring and a position between the other end portion of the outer ring and the other end portion of the inner ring, the sealing device including a metal core that has a cylindrical portion that is fitted to an outer periphery of the outer ring, and an elastic seal that is fitted to the metal core. An inner diameter of the cylindrical portion of the metal core is set to such a value that the cylindrical portion is fitted to the outer ring by interference fit. An inner periphery of an end portion of the cylindrical portion is larger in diameter than an inner periphery of a portion of the cylindrical portion, which is fitted to the outer ring. The elastic seal has a cylindrical portion that is in close contact with an outer periphery of the cylindrical portion of the metal core and a folded-back portion that extends from the cylindrical portion, and the folded-back portion is compressively deformed by being sandwiched between the inner periphery of the end portion of the cylindrical portion of the metal core and the outer periphery of the outer ring.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
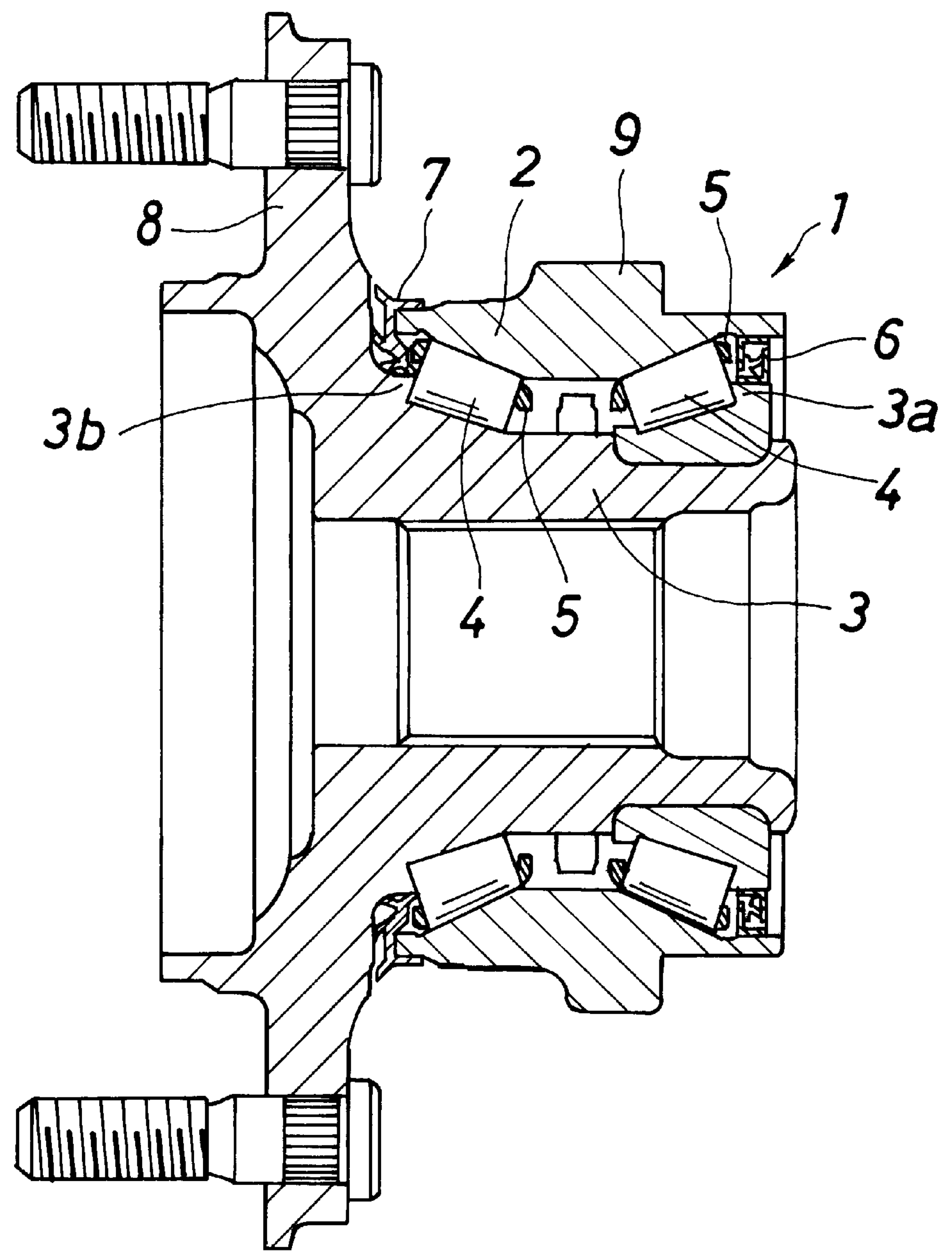
FIG. 1 is a longitudinal sectional view showing a rolling bearing unit according to a first embodiment of the invention.
Figure 2:
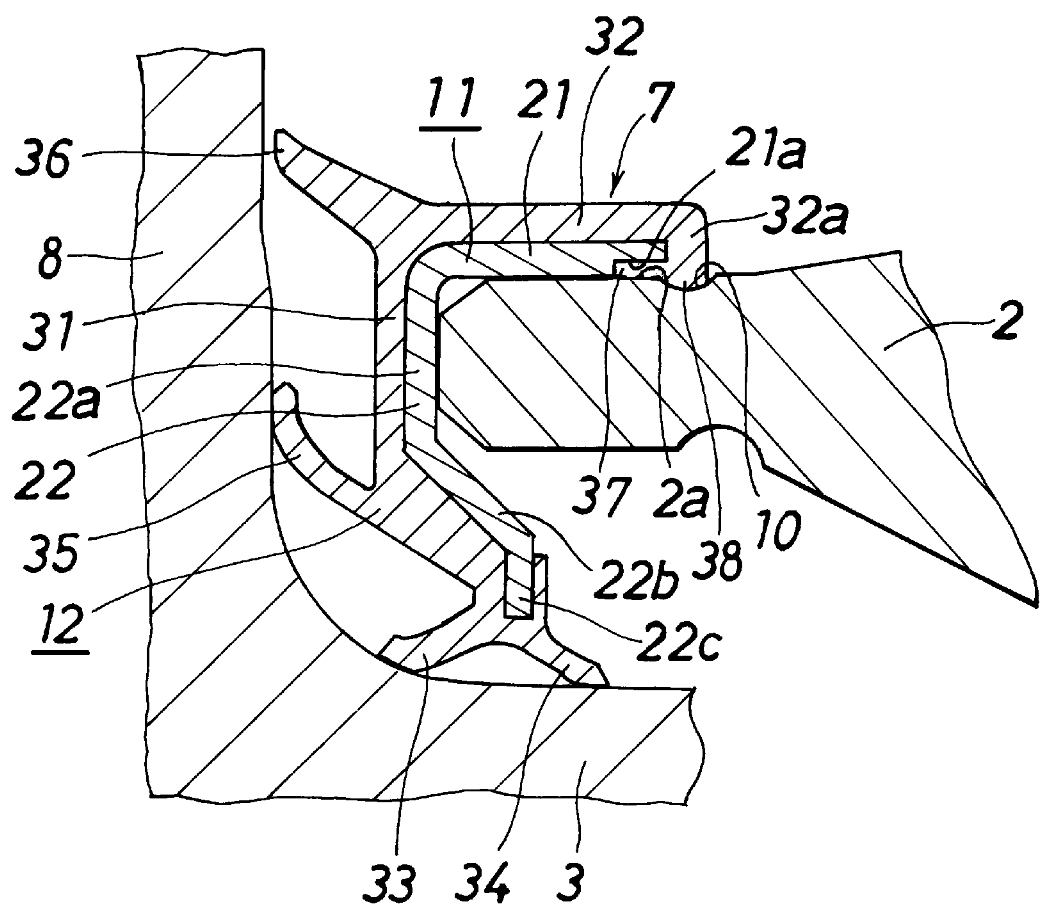
FIG. 2 is an enlarged longitudinal sectional view showing main part of the rolling bearing unit according to the first embodiment of the invention.

FIG. 1 and FIG. 2 each show a rolling bearing unit according to a first embodiment of the invention.

A rolling bearing unit 1 is suitable for use in, for example, a hub unit for a vehicle. The rolling bearing unit 1 includes an outer ring 2, an inner ring 3, a plurality of tapered rollers (rolling elements) 4, cages 5, and sealing devices 6, 7. The tapered rollers 4 are arranged in two rows between the outer ring 2 and the inner ring 3. The cages 5 hold the tapered rollers 4. The sealing device 6 is disposed between the outer ring 2 and the inner ring 3, at a position on the inboard side, and the sealing device 7 is disposed between the outer ring 2 and the inner ring 3, at a position on the outboard side. A flange 8, to which a wheel is fitted, is formed on the outboard-side of the inner ring 3. A flange 9, to which a knuckle that is a vehicle body-side member is fitted, is formed on the outer ring 2.

The inner ring 3 has large ribs 3*a*, 3*b* at its respective end portions. The large ribs 3*a*, 3*b* receive the tapered rollers 4. The outboard-side flange 8 extends radially outward from a portion near the outboard-side large rib 3*b* of the inner ring 3 with a small clearance left between the outboard-side flange 8 and an outboard-side end face of the outer ring 2.

The inboard-side sealing device 6 is a so-called pack seal, and is disposed between and fitted to an inner periphery of the outer ring 2 and an outer periphery of the inner ring 3. The outboard-side sealing device 7 is a sealing device that is fitted to an outer periphery 2*a* of the outer ring 2.

FIG. 2 shows the outboard-side sealing device 7 that is main part of the rolling bearing unit 1 according to the invention.

The sealing device 7 includes a metal core 11 that has an L-shaped section and is fitted to the outer ring 2, and an elastic seal 12 that is fitted to the metal core 11.

The metal core 11 has a cylindrical portion 21 fitted to the outer periphery 2*a* of the outer ring 2, and an annular portion 22 that extends radially inward from an axially outer end of the cylindrical portion 21.

The inner diameter of the cylindrical portion 21 of the core metal 11 is set to such a value that the cylindrical portion 21 is fitted to the outer ring 2 by interference fit. An inner periphery 21*a* of an inboard-side end portion of the cylindrical portion 21 is larger in diameter than an inner periphery of an outboard-side portion of the cylindrical portion 21, which is fitted to the outer ring 2.

The annular portion 22 of the metal core 11 has an outer annular portion 22*a*, a tapered portion 22*b*, and an inner annular portion 22*c*. The outer annular portion 22*a* is in contact with the end face of the outer ring 2. The tapered portion 22*b* extends axially inward and radially inward from a radially inner end of the outer annular portion 22*a*. The inner annular portion 22*c* extends radially inward from a radially inner end of the tapered portion 22*b*.

The elastic seal 12 has an annular portion 31, a cylindrical portion 32, two radial lips 33, 34, an axial lip 35, and a labyrinth lip 36. The annular portion 31 is arranged so as to be in close contact with the annular portion 22 of the metal core 11. The cylindrical portion 32 is arranged so as to be in close contact with the cylindrical portion 21 of the metal core 11. The radial lips 33, 34 are formed at a radially inner end of the annular portion 31. The axial lip 35 and the labyrinth lip 36 are formed at radially outer portions of the annular portion 31.

The two radial lips 33, 34 face the outer periphery of the inner ring 3 with small clearances left between the radial lips 33, 34 and the outer periphery of the inner ring 3. The axial lip 35 is in sliding contact with the outboard-side flange 8 of the inner ring 3. The labyrinth lip 36 is located radially outward of the axial lip 35, and faces the outboard-side flange 8 of the inner ring 3 with a small clearance left between the labyrinth lip 36 and the outboard-side flange 8. At least one of the two radial lips 33, 34 may be in sliding contact with the outer periphery of the inner ring 3. The labyrinth lip 36 may be in sliding contact with the outboard-side flange 8 of the inner ring 3.

The elastic seal 12 further has a folded-back portion 37 and an annular protrusion 38. The folded-back portion 37 extends from an axially inner end of the cylindrical portion 32. The annular protrusion 38 protrudes radially inward from a base portion of the folded-back portion 37. The folded-back portion 37 is formed in the shape of a cylinder that extends axially outward from a flange portion 32*a* that extends radially inward from an end of the cylindrical portion 32.

The folded-back portion 37 is fitted to the inner periphery 21*a* of the inboard-side end portion of the cylindrical portion 21 by folding an inboard-side end portion of the cylindrical portion 32 radially inward. The thickness of the folded-back portion 37, which has not been fitted to the outer ring 2, is larger than a clearance between the inner periphery 21*a* of the inboard-side end portion of the metal core 11 and the outer periphery 2*a* of the outer ring 2. Therefore, the folded-back portion 37 is in close contact with the inner periphery 21*a* of the inboard-side end portion of the metal core 11 and the outer periphery 2*a* of the outer ring 2 in a state where the folded-back portion 37 is compressively deformed by being sandwiched between the inner periphery 21*a* of the inboard-side end portion of the cylindrical portion 21 of the metal core 11 and the outer periphery 2*a* of the outer ring 2.

The outer ring 2 has an annular groove 10 at a position corresponding to the base portion of the folded-back portion 37. The annular groove 10 has an arc-shape in section. The thickness of the annular protrusion 38, which has not been fitted to the outer ring 2, is larger than the depth of the annular groove 10. Therefore, the annular protrusion 38 is fitted in the annular groove 10 formed in the outer ring 2 while being compressively deformed.

Figure 3:
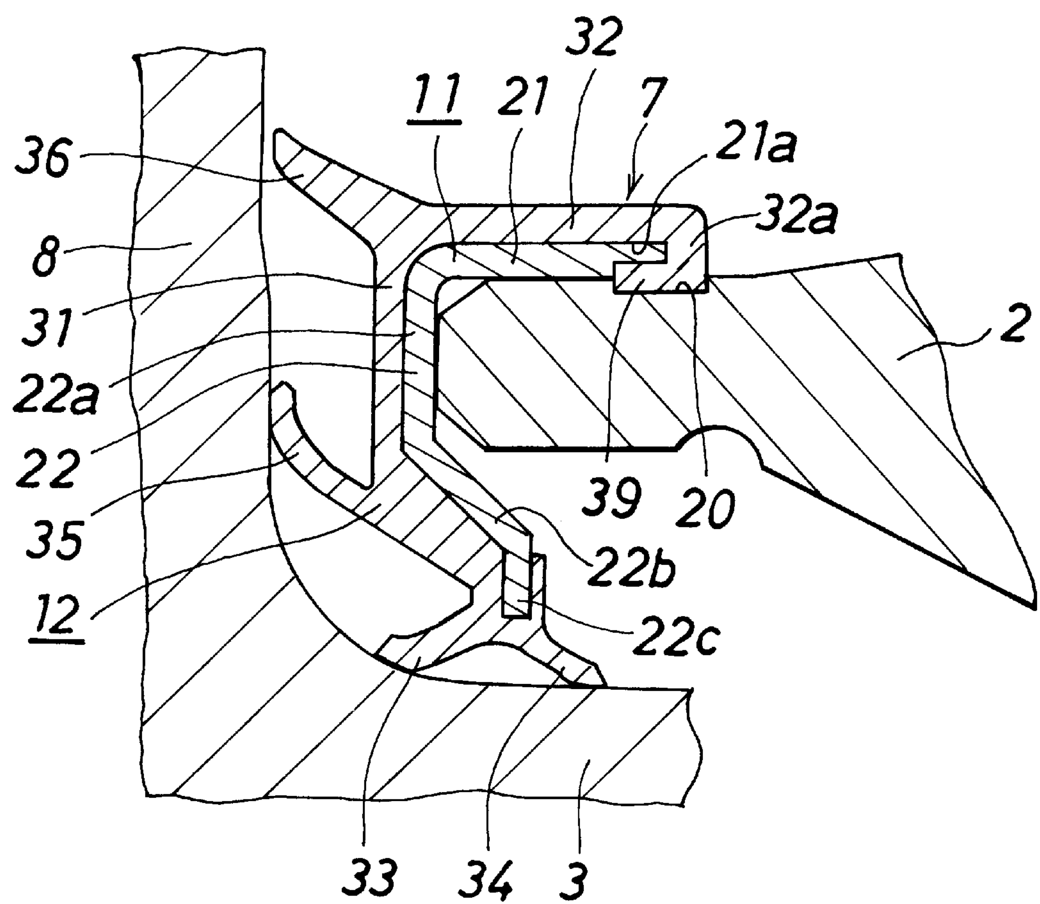
FIG. 3 is an enlarged longitudinal sectional view showing main part of a rolling bearing unit according to a second embodiment of the invention.

In FIG. 2, the annular groove 10 has an arc-shape in section, and is located at the position corresponding to the base portion of the folded-back portion 37. However, the sectional shape of the annular groove 10 is not limited to an arc-shape, and the position of the annular groove 10 is not limited to the position corresponding to the folded-back portion 37. For example, as shown in FIG. 3, an annular groove 20 which is rectangular in section may be formed instead of the annular groove 10. In addition, the annular groove 20 may be formed such that the entirety of a folded-back portion 39 is fitted in the annular groove 20 and a distal end face of the folded-back portion 39 is in contact with a side face (a step portion) of the annular groove 20. In this case, the thickness of the folded-back portion 39, which has not been fitted to the outer ring 2, is larger than a clearance between the inner periphery 21*a* of the inboard-side end portion of the metal core 11 and a bottom face of the annular groove 20. Therefore, the folded-back portion 39 is in close contact with the inner periphery 21*a* of the inboard-side end portion of the metal core 11 and the bottom face of the annular groove 20 (outer periphery of the outer ring 2) in a state where the folded-back portion 39 is compressively deformed by being sandwiched between the inner periphery 21*a* of the inboard-side end portion of the cylindrical portion 21 of the metal core 11 and the bottom face of the annular groove 20.

In the above-described embodiment, lips of the elastic seal 12 are the two radial lips 33, 34, the one axial lip 35, and the one axial labyrinth lip 36. However, lips of the elastic seal 12 are not limited to these lips. In addition, the annular groove 20 may be omitted, and the folded-back portion 39 may be pressed against the outer periphery of the outer ring 2 to be brought into contact with the outer periphery of the outer ring 2.

In the rolling bearing unit according to the invention, the inner periphery of the inboard-side end portion of the cylindrical portion of the metal core is larger in diameter than the portion of the cylindrical portion, which is fitted to the outer ring. In addition, the elastic seal has the folded-back portion that is compressively deformed by being sandwiched between the inner periphery of the inboard-side end portion of the cylindrical portion of the metal core and the outer periphery of the outer ring. Therefore, the metal core and the outer ring more tightly contact the elastic seal. As a result, it is possible to more reliably prevent entry of water into the rolling bearing unit, thereby improving the waterproof property.

What is claimed is:

1. A rolling bearing unit, comprising:

an outer ring;

an inner ring;

a plurality of rolling elements; and a sealing device that is disposed at at least one of a position between one end portion of the outer ring and one end portion of the inner ring and a position between the other end portion of the outer ring and the other end portion of the inner ring, the sealing device including a metal core that has a cylindrical portion that is fitted to an outer periphery of the outer ring, and an elastic seal that is fitted to the metal core, wherein an inner diameter of the cylindrical portion of the metal core is set to such a value that the cylindrical portion is fitted to the outer ring by interference fit, an inner periphery of an end portion of the cylindrical portion is larger in diameter than an inner periphery of a portion of the cylindrical portion, which is fitted to the outer ring, the outer ring has an annular groove at a position corresponding to an end face of the cylindrical portion of the metal core;

the elastic seal has a cylindrical portion that is in close contact with an outer periphery of the cylindrical portion of the metal core, a folded-back portion that extends from the cylindrical portion, and an annular protrusion, and the folded-back portion is compressively deformed by being sandwiched between the inner periphery of the end portion of the cylindrical portion of the metal core and the outer periphery of the outer ring and the annular protrusion is compressively deformed by the inner periphery of the end portion of the cylindrical portion in the metal core and fitted into the annular groove.

2. The rolling bearing unit according to claim 1, wherein:

the annular protrusion is formed from the folded-back portion, and the folded-back portion of the elastic seal is compressively deformed by being fitted into the annular groove such that a distal end of the folded-back portion is in contact with a side face of the annular groove.

3. The rolling bearing unit according to claim 1, wherein:

the inner diameter of the cylindrical portion of the metal core is set to such a value that the cylindrical portion is fitted to the outer ring by interference fit, and an inner periphery of an inbound side end portion of the cylindrical portion is larger in diameter than an inner periphery of an outboard side portion of the cylindrical portion, which is fitted to the outer ring.

* * * * *